United States Patent
Jung et al.

(10) Patent No.: US 8,271,192 B2
(45) Date of Patent: Sep. 18, 2012

(54) NAVIGATION APPARATUS AND METHOD THEREOF

(75) Inventors: Se-Young Jung, Seoul (KR);
Jung-Hyun Hwang, Seoul (KR);
Jin-Seok Choi, Yongin (KR); Jong-Sun Park, Seoul (KR)

(73) Assignee: LG Electronics Inc., Seoul (KR)

( * ) Notice: Subject to any disclaimer, the term of this patent is extended or adjusted under 35 U.S.C. 154(b) by 500 days.

(21) Appl. No.: 12/564,773

(22) Filed: Sep. 22, 2009

(65) Prior Publication Data

US 2010/0100318 A1    Apr. 22, 2010

(30) Foreign Application Priority Data

Oct. 20, 2008  (KR) ................. 10-2008-0102762

(51) Int. Cl.
*G01S 1/24* (2006.01)

(52) U.S. Cl. ........ 701/428; 701/493; 701/518; 701/538; 701/24; 342/357.25; 342/457; 340/990; 73/178 R

(58) Field of Classification Search .............. 701/493, 701/538, 24, 518, 428; 342/357.25, 457; 340/990; 73/178 R
See application file for complete search history.

(56) References Cited

U.S. PATENT DOCUMENTS

| 7,317,158 B2 * | 1/2008 | Yamamoto | ................ 84/612 |
| 2008/0221789 A1 * | 9/2008 | Oono | ............................ 701/208 |

\* cited by examiner

*Primary Examiner* — Thomas Black
*Assistant Examiner* — Luke Huynh
(74) *Attorney, Agent, or Firm* — Birch, Stewart, Kolasch & Birch, LLP

(57) ABSTRACT

A method of controlling a navigation apparatus, and which includes measuring, via a sensor, an environmental characteristic including at least one of an altitude of the navigation apparatus and an atmospheric pressure of an atmosphere the navigation apparatus is operating in; extracting, via a controller, a hearing characteristic including a degree of hearing impairment for a user operating the navigation apparatus from a memory based on the measured environmental characteristic; and compensating, via the controller, audio output by the navigation apparatus using the extracted degree of hearing impairment for the user operating the navigation apparatus.

18 Claims, 9 Drawing Sheets

NAVIGATION APPARATUS AND METHOD THEREOF

CROSS-REFERENCE TO A RELATED APPLICATION

The present application claims priority to Korean Application No. 10-2008-0102762 filed on Oct. 20, 2008, which is herein expressly incorporated by reference in its entirety.

BACKGROUND OF THE INVENTION

1. Field of the Invention

The present invention relates to a navigation apparatus and corresponding method of controlling the navigation apparatus.

2. Description of the Related Art

A navigation apparatus is a device for generating road guide information based on a global positioning system (GPS) signal and map information, and providing the road guide information to a user.

SUMMARY OF THE INVENTION

Accordingly, one object of the present invention is to address the above-noted and other problems.

Another object of the present invention is to provide a novel navigation apparatus and corresponding method for amplifying input sound based on changing environmental conditions.

To achieve these and other advantages and in accordance with the purpose of the present invention, as embodied and broadly described herein, the present invention provides in one aspect a method of controlling a navigation apparatus, and which includes measuring, via a sensor, an environmental characteristic including at least one of an altitude of the navigation apparatus and an atmospheric pressure of an atmosphere the navigation apparatus is operating in; extracting, via a controller, a hearing characteristic including a degree of hearing impairment for a user operating the navigation apparatus from a memory based on the measured environmental characteristic; and compensating, via the controller, audio output by the navigation apparatus using the extracted degree of hearing impairment for the user operating the navigation apparatus.

In another aspect, the present invention provides a navigation apparatus including a sensor configured to measure an environmental characteristic including at least one of an altitude of the navigation apparatus and an atmospheric pressure of an atmosphere the navigation apparatus is operating in; a memory configured to store a hearing characteristic including a degree of hearing impairment for a user operating the navigation apparatus; an audio unit configured to output audio; and a controller configured to extract the degree of hearing impairment for the user operating the navigation apparatus from the memory based on the measured environmental characteristic, and to compensate the audio output by the navigation apparatus using the extracted degree of hearing impairment for the user operating the navigation apparatus.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Reference will now be made in detail to the preferred embodiments of the present invention, examples of which are illustrated in the accompanying drawings.

Figure 1:
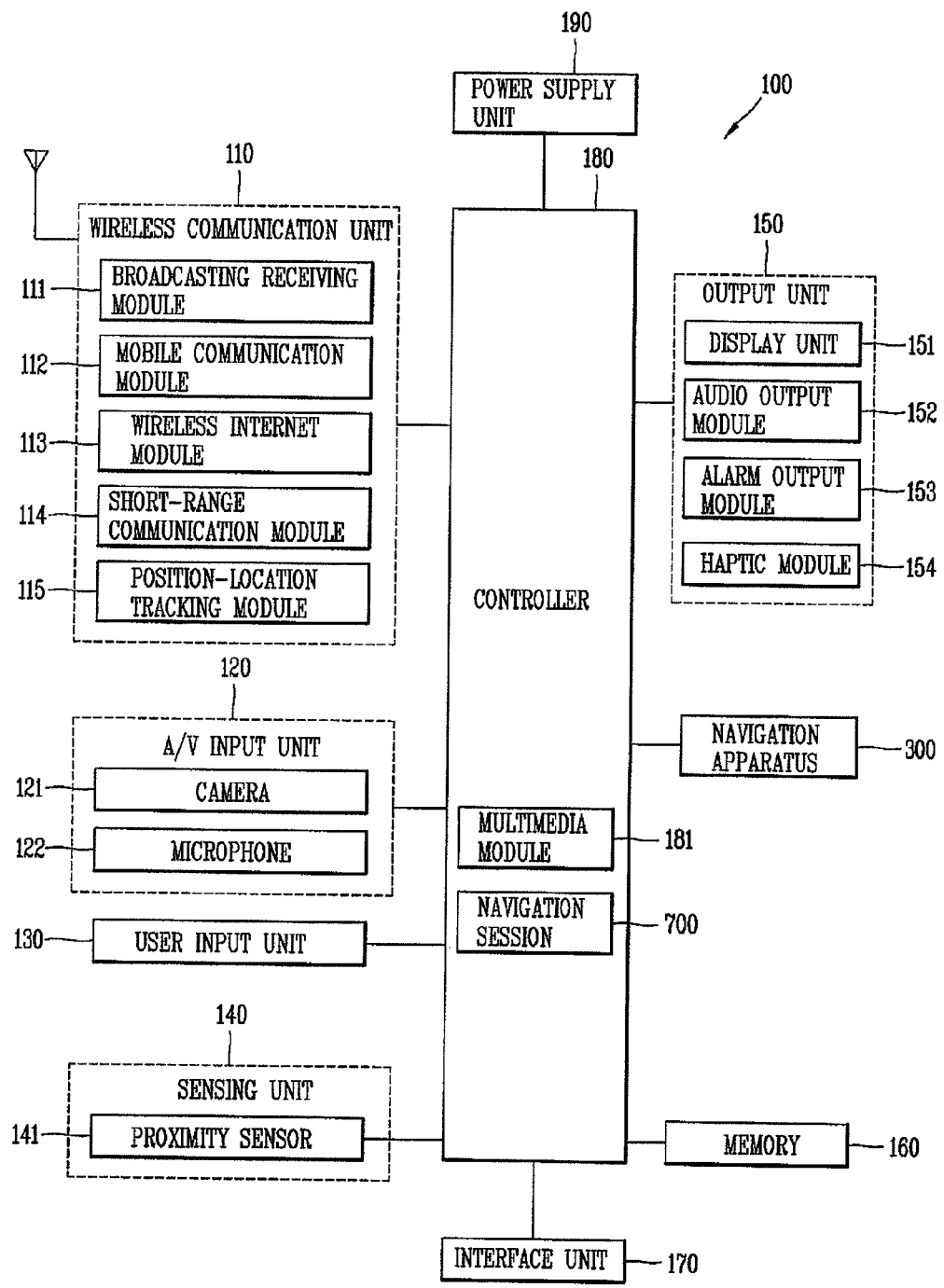
FIG. 1 is a block diagram illustrating a mobile terminal to which a navigation apparatus according to an embodiment of the present invention is applied.

FIG. 1 is a block diagram of a mobile terminal 100 including a navigation function according to an embodiment of the present invention. As shown, the mobile terminal 100 includes a wireless communication unit 110 having one or more components, which permits wireless communication between the mobile terminal 100 and a wireless communication system or network within which the mobile terminal is located.

For example, as shown in FIG. 1, the wireless communication unit 110 includes a broadcast receiving module 111 that receives a broadcast signal and/or broadcast associated information from an external broadcast managing entity via a broadcast channel. The broadcast channel may include a satellite channel and a terrestrial channel. In addition, the broadcast managing entity generally refers to a system which transmits a broadcast signal and/or broadcast associated information. Examples of broadcast associated information include information associated with a broadcast channel, a broadcast program, a broadcast service provider, etc. For instance, broadcast associated information may include an electronic program guide (EPG) of the digital multimedia broadcasting (DMB) system and an electronic service guide (ESG) of the digital video broadcast-handheld (DVB-H) system.

In addition, the broadcast signal may be implemented as a TV broadcast signal, a radio broadcast signal, and a data broadcast signal, among others. The broadcast signal may further include a broadcast signal combined with a TV or radio broadcast signal. The broadcast receiving module 111 is also configured to receive broadcast signals transmitted from various types of broadcast systems. For example, such broadcasting systems include the digital multimedia broadcasting-terrestrial (DMB-T) system, the digital multimedia broadcasting-satellite (DMB-S) system, the digital video broadcast-handheld (DVB-H) system, the data broadcasting system known as media forward link only (MediaFLO®) and the integrated services digital broadcast-terrestrial (ISDB-T) system among others. Receiving multicast signals is also possible. Further, data received by the broadcast receiving module 111 may be stored in a suitable device, such as a memory 160.

The wireless communication unit 110 also includes a mobile communication module 112 that transmits/receives wireless signals to/from one or more network entities (e.g., base station, Node-B). Such signals may represent audio, video, multimedia, control signaling, and data, among others. Also included is a wireless Internet module 113 that supports Internet access for the mobile terminal. The wireless Internet module 113 may be internally or externally coupled to the terminal. The wireless communication unit 110 also includes a short-range communication module 114 that facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

A position-location tracking module 115 is also included in the wireless communication unit 110 and identifies or otherwise obtains the location of the mobile terminal 100. The position-location tracking module 115 may be implemented using global positioning system (GPS) components which cooperate with associated satellites, network components, and combinations thereof. In addition, as shown in FIG. 1, the mobile terminal 100 also includes an Audio/video (A/V) input unit 120 that provides audio or video signals to the mobile terminal 100. As shown, the A/V input unit 120 includes a camera 121 and a microphone 122. The camera 121 receives and processes image frames of still pictures or video.

Further, the microphone 122 receives an external audio signal while the portable device is in a particular mode, such as a phone call mode, recording mode and voice recognition mode. The received audio signal is then processed and converted into digital data. Also, the portable device, and in particular, the A/V input unit 120, generally includes assorted noise removing algorithms to remove noise generated in the course of receiving the external audio signal. In addition, data generated by the A/V input unit 120 may be stored in the memory 160, utilized by an output unit 150, or transmitted via one or more modules of the communication unit 110. If desired, two or more microphones and/or cameras may be used.

The mobile terminal 100 also includes a user input unit 130 that generates input data responsive to user manipulation of an associated input device or devices. Examples of such devices include a keypad, a dome switch, a touchpad (e.g., static pressure/capacitance), a jog wheel and a jog switch. A specific example is one in which the user input unit 130 is configured as a touchpad in cooperation with a touch screen display, which will be described in more detail below.

A sensing unit 140 is also included in the mobile terminal 100 and provides status measurements of various aspects of the mobile terminal 100. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, an orientation or acceleration/deceleration of the mobile terminal 100, etc. As shown in FIG. 1, the sensing unit 140 also includes a proximity sensor 141.

The proximity sensor 141 may be arranged at an inner region of the mobile terminal 100 surrounded by a touch screen or may be arranged adjacent to the touch screen. Further, the proximity sensor 141 is a sensor for detecting the presence or absence of an object approaching to a certain detection surface or an object that exists nearby by using the force of electromagnetism or infrared rays without a mechanical contact. The proximity sensor 141 also has a considerably longer life span compared with a contact type sensor, and it can be utilized for various purposes.

The proximity sensor 141 may also include a transmissive type photoelectric sensor, a direct reflective type photoelectric sensor, a mirror reflective type photoelectric sensor, a high-frequency oscillation type proximity sensor, a capacitance type proximity sensor, a magnetic type proximity sensor, an infrared rays proximity sensor, and the like. When the touch screen is implemented as a capacitance type, the proximity of a pointer to the touch screen is sensed by changes of an electromagnetic field. In this case, the touch screen (touch sensor) may be categorized into a proximity sensor.

In the following description, for the sake of brevity, recognition of the pointer positioned to be close to the touch screen, although the pointer is not actually brought into contact with the touch screen, will be called a "proximity touch", while recognition of actual contacting of the pointer on the touch screen will be called a "contact touch". In addition, the position where the pointer is proximately touched on the touch screen indicates a position where the pointer is positioned to correspond vertically to the touch screen when the pointer is proximately touched.

Also, the proximity sensor 141 may detect a proximity touch, and a proximity touch pattern (e.g., a proximity touch distance, a proximity touch direction, a proximity touch speed, a proximity touch time, a proximity touch position, a proximity touch movement state, or the like). Information corresponding to the detected proximity touch operation and the proximity touch pattern may be output onto the touch screen.

In addition, when the mobile terminal 100 is a slide-type mobile terminal, the sensing unit 140 may sense whether a sliding portion of the mobile terminal 100 is open or closed. Other examples include the sensing unit 140 sensing the presence or absence of power provided by a power supply 190, the presence or absence of a coupling or other connection between an interface unit 170 and an external device, etc.

Further, the interface unit 170 is implemented to couple the mobile terminal 100 with external devices such as wired/wireless headphones, external chargers, power supplies, storage devices configured to store data (e.g., audio, video, pictures, etc.), earphones, and microphones, among others. In addition, the interface unit 170 may be configured using a wired/wireless data port, a card socket (e.g., for coupling to a memory card, a subscriber identity module (SIM) card, a user identity module (UIM) card, a removable user identity module (RUIM) card, etc.), audio input/output ports and video input/output ports.

The output unit 150 includes various components which support the output requirements of the mobile terminal 100. The mobile terminal 100 also includes a display unit 151 (hereinafter referred to as the display unit 151) that visually displays information associated with the mobile terminal 100. For instance, if the mobile terminal 100 is operating in a phone call mode, the display unit 151 may provide a user interface or graphical user interface which includes information associated with placing, conducting, and terminating a phone call. As another example, if the mobile terminal 100 is in a video call mode or a photographing mode, the display unit 151 may additionally or alternatively display images which are associated with these modes.

Further, the display unit 151 also preferably includes a touch screen working in cooperation with an input device, such as a touchpad. This configuration permits the display unit 151 to function both as an output device and an input device. In addition, the display unit 151 may be implemented using display technologies including, for example, a liquid crystal display (LCD), a thin film transistor-liquid crystal display (TFT-LCD), an organic light-emitting diode display (OLED), a flexible display, a three-dimensional display, and a transparent OLED (TOLED).

The mobile terminal 100 may also include one or more of such displays. An example of a two-display embodiment is one in which one display is configured as an internal display (viewable when the terminal is in an opened position) and a second display configured as an external display (viewable in both the open and closed positions). FIG. 1 further shows the output unit 150 having an audio output module 152 which supports the audio output requirements of the mobile terminal 100. The audio output module 152 can be implemented using one or more speakers, buzzers, other audio producing devices, and combinations thereof. Further, the audio output module 152 functions in various modes including a call-receiving mode, a call-placing mode, a recording mode, a voice recognition mode and a broadcast reception mode. During operation, the audio output module 152 outputs audio relating to a particular function (e.g., a call received, message received, and errors).

In addition, the output unit 150 is further shown having an alarm output module 153, which is used to signal or otherwise identify the occurrence of a particular event associated with the mobile terminal 100. Typical events include a call received, a message received and user input received. An example of such output includes the providing of tactile sensations (e.g., vibration) to a user. For instance, the alarm output module 153 may be configured to vibrate responsive to the mobile terminal 100 receiving a call or message. As another example, a vibration is provided by the alarm output module 153 responsive to receiving user input at the mobile terminal 100, thus providing a tactile feedback mechanism. Further, the various outputs provided by the components of the output unit 150 may be separately performed, or such output may be performed using any combination of such components.

A haptic module 154 is also included in the output unit 150 according to one embodiment of the present invention. The haptic module 154 generates various tactile effects the user may feel. A typical example of the tactile effects generated by the haptic module 154 is vibration. Intensity, pattern, or the like, generated by the haptic module 154 can also be controlled by a controller 180. For example, different vibrations may be combined to be output or sequentially output.

The haptic module 154, in addition to vibration, may generate various other tactile effects such as an effect by stimulation such as a pin arrangement vertically moving with respect to the contacted skin surface, a spray force or suction force of air through a jet orifice or a suction opening, a brush (or contact) with respect to the skin surface, a contact of an electrode, electrostatic force, or the like, or an effect by reproduction of thermal sense using an element that can absorb or generate heat.

Further, the haptic module 154 may be implemented to allow the user to feel a tactile effect through a muscle sensation such as fingers or arm of the user, as well as transferring the tactile effect through a direct contact. Two or more haptic modules 154 may be provided according to the configuration of the mobile terminal 100.

Figure 2:
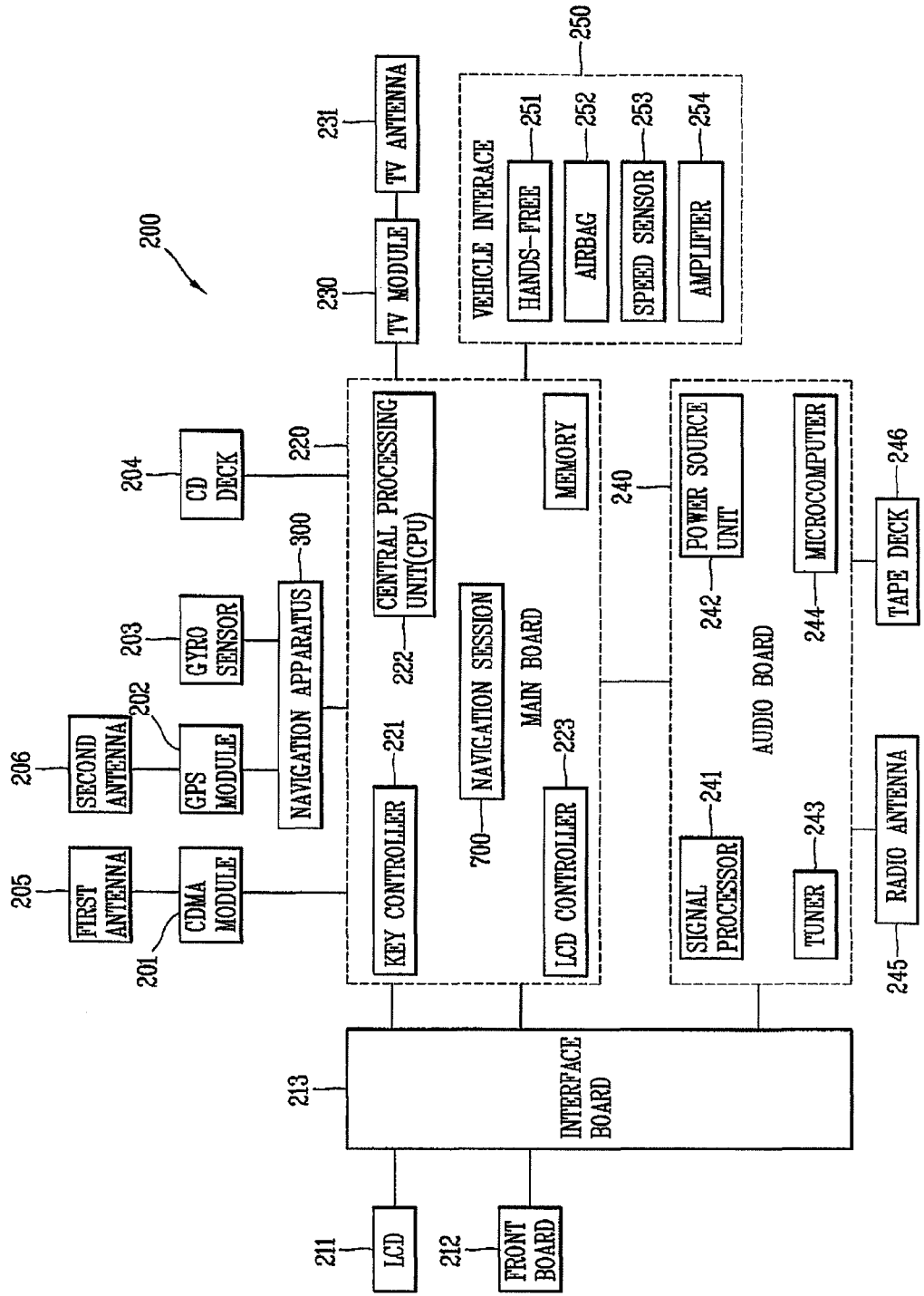
FIG. 2 is a block diagram illustrating a telematics terminal to which a navigation apparatus according to an embodiment of the present invention is applied.

In addition, the memory 160 is generally used to store various types of data to support the processing, control, and storage requirements of the mobile terminal 100. Examples of such data include program instructions for applications operating on the mobile terminal 100, call history, contact data, phonebook data, messages, pictures, video, etc. Further, the memory 160 shown in FIG. 2 may be implemented using any type or combination of suitable volatile and non-volatile memory or storage devices including random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory, or other similar memory or data storage device.

The terminal 100 also includes the controller 180 that generally controls the overall operations of the mobile terminal 100. For instance, the controller 180 performs the control and processing associated with voice calls, data communications, instant message communications, video calls, camera operations and recording operations. As shown in FIG. 1, the controller 180 also includes a multimedia module 181 for providing multimedia playback functions. The multimedia module 181 may be configured as part of the controller 180, or may be implemented as a separate component. In addition, a power supply 190 provides power used by the various components for the portable device. The provided power may be internal power, external power, or combinations thereof.

Further, a navigation session 700 is also included within the controller 180 of the mobile terminal 100 according to an embodiment of the present invention. In one embodiment, the navigation session 700 interfaces with a navigation apparatus 300 applied to the mobile terminal 100 according to an embodiment of the present invention, when generating road guide information, compensates a user's hearing characteristic based on the altitude and/or atmospheric pressure difference of the navigation apparatus 300 to generate road guide information, or compensates a user's hearing characteristic based on the altitude and/or atmospheric pressure difference of the navigation apparatus 300 for any input signals, and then outputs the compensated signals.

For example, when generating road guide information based on a current location of the navigation apparatus 300, and when a specific frequency bandwidth of the pre-stored hearing characteristic is included in the voice information included in the road guide information based on the pre-stored hearing characteristic for a current altitude of the navigation apparatus 300, the navigation apparatus 300 in association with the navigation session 700 outputs the road guide information in which voice information corresponding to the specific frequency bandwidth among the voice information within the road guide information is compensated by a specific dB included in the pre-stored hearing characteristic.

In addition, when a specific frequency bandwidth of the pre-stored hearing characteristic is included in input signals based on the pre-stored hearing characteristic for a current altitude of the navigation apparatus 300, the navigation apparatus 300 can output a signal corresponding to the specific frequency bandwidth among the input signals compensated by a specific dB included in the hearing characteristic. The function of the navigation apparatus 300 according to an embodiment of the present invention may be implemented in the navigation apparatus 300 itself, or implemented by the controller 180 of the mobile terminal 100.

Figure 3:
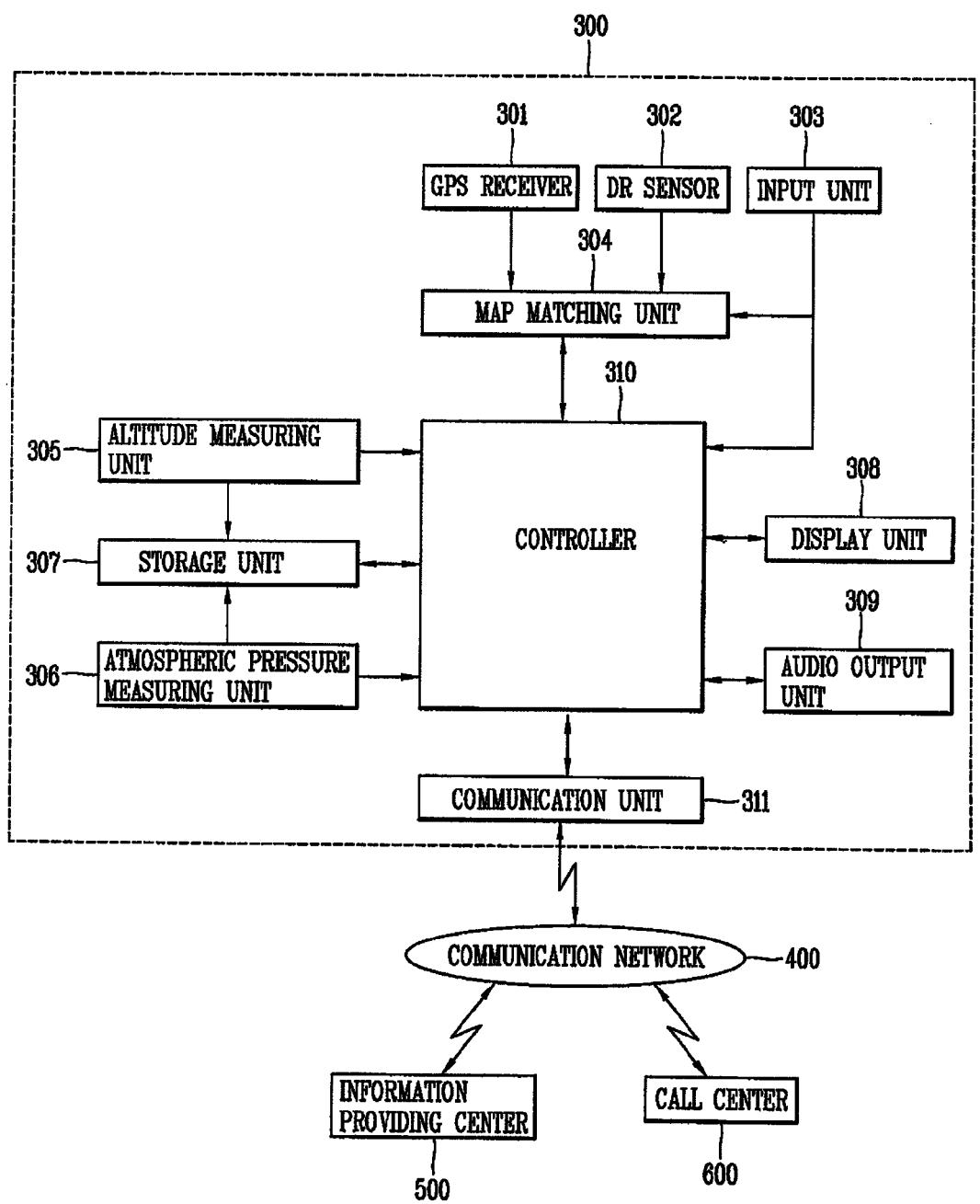
FIG. 3 is a block diagram illustrating a navigation apparatus according to an embodiment of the present invention.

Next, FIG. 3 is a block diagram illustrating the navigation apparatus 300 according to an embodiment of the present invention. As shown in FIG. 3, the navigation apparatus 300 includes a GPS receiver 301, a dead-reckoning (DR) sensor 302, an input unit 303, a map matching unit 304, an altitude measuring unit 305, an atmospheric pressure measuring unit 306, a storage unit 307, a display unit 308, an audio output unit 309, a controller 310, and a communication unit 311.

The GPS receiver 301 receives GPS signals transmitted from one or more GPS satellites, generates a first location data of the navigation apparatus 300 (considered to be at the same location as the telematics terminal 200 or mobile terminal 100) in a real-time manner based on the latitude and longitude coordinates included in the received GPS signal, and outputs the generated first location data to the map matching unit 304. Further, the generated first location data is defined as a current location or current location data of the navigation apparatus 300. The location information may also be received through a Wi-Fi or Wibro communication as well as through the GPS receiver 301.

In addition, the signal received through the GPS receiver 301 may be configured to provide the location information of a terminal to the navigation apparatus 300 using wireless communication methods including the Institute of Electrical and Electronics Engineers (IEEE), such as the IEEE 802.11 Wireless Network Standard for a wireless LAN including wireless LANs, infrared communications, etc., the IEEE 802.15 Standard for a wireless personal area network (PAN) including Bluetooth, UWB, ZigBee, etc., the IEEE 802.16 Standard for a wireless metropolitan area network (MAN) broadband wireless access (BWA) including fixed wireless accesses (FWA), etc., and the IEEE 802.20 Mobile Internet Standard for a wireless MAN mobile broadband wireless access (MBWA) including Wibro, WiMAX, etc.

In addition, when the navigation apparatus 300 is mounted to a vehicle, the DR sensor 302 measures a traveling direction and a speed of the vehicle, generates a second location data based on the measured traveling direction and speed of the vehicle, and outputs the generated second location data to the map matching unit 304. The GPS receiver 301 also constitutes a data collection unit together with the DR sensor 302. Further, the technology of generating an estimated location of the navigation apparatus (or terminal or vehicle) based on the first location data generated by the GPS receiver 301 and the second location data generated by the DR sensor 302 is known, and therefore detailed explanations are omitted.

In addition, the input unit 303 receives a button manipulation by the user, or receives a command or control signal by the manipulation of touching/scrolling a displayed screen, or the like. The input unit 303 also selects the user's desired function or receives information, and various devices such as a keypad, a touch screen, a jog shuttle, a microphone, a mouse, and the like, may be used. Further, the map matching unit 304 generates an estimated location of the vehicle based on the first and second location data, and reads the map data corresponding to a driving path from the storage unit 307.

The map matching unit 304 also matches the estimated location of the vehicle with a link (road) included in the map data, and outputs the matched map information (map-matched result) to the controller 310. For example, the map matching unit 304 generates an estimated location of the vehicle based on the first and second location data, matches the generated estimated location of the vehicle with links within the map data stored in the storage unit 307 based on the link sequence thereof, and outputs the matched map information (map-matched result) to the controller 310. Further, the map matching unit 304 outputs road attribute information such as single-level or double-level roads included in the matched map information (map-matched result) to the controller 310. The function of the map matching unit 304 can also be implemented by the controller 310.

In addition, the altitude measuring unit 305 is provided on a surface at an inner or outer side of the navigation apparatus 300, and measures an altitude of the point at which the navigation apparatus 300 is located. When the atmospheric pressure is changed based on a location movement of the navigation apparatus 300 being above sea level, for example, the altitude measuring unit 305 detects the changed amount to measure the current altitude.

Further, the atmospheric pressure measuring unit 306 is provided on a surface at an inner or outer side of the navigation apparatus 300, and measures an atmospheric pressure of the point at which the navigation apparatus 300 is located. The altitude measuring unit 305 and the atmospheric pressure measuring unit 306 may also be configured as a device capable of measuring altitude and atmospheric pressure together.

In addition, the storage unit 307 stores map data, and various information such as menu screens, points of interest (hereinafter, "POI"), function characteristic information based on specific locations of the map data, and the like. The storage unit 307 also stores various user interfaces (UI) and/or graphic user interfaces (GUI), and stores data, programs, and the like, which are used for operating the navigation apparatus 300. Further, the storage unit 307 stores an altitude of the terminal measured by the altitude measuring unit 305. Also, in one embodiment of the present invention, the storage unit 307 stores a hearing characteristic (or information on the hearing characteristic) for a user or a specific user that has passed user authentication.

The information for the user's hearing characteristic includes a specific altitude affecting the user's hearing impairment or auditory impairment, at least one or more specific frequency bandwidths affecting the user's hearing impairment based on the specific altitude, and a degree or level of hearing impairment indicated by a specific dB value, which corresponds to the at least one or more specific frequency bandwidths. For example, as illustrated in Table 1, the hearing characteristics for the user stored in the storage unit 307 is respectively classified and stored for each altitude, frequency bandwidth, and hearing impairment degree for the hearing characteristic divided for each user.

In other words, the hearing characteristic for the user A may be shown by the specific frequency bandwidth 1-1.3 KHz at the altitude of 300 m, and the hearing impairment degree of 5 dB corresponding to the specific frequency bandwidth (1-1.3 KHz). Table 1 also shows the specific frequency bandwidth 2-2.5 KHz at the altitude of 500 m, and the hearing impairment degree of 15 dB corresponding to the specific frequency bandwidth (2-2.5 KHz). In this manner, the hearing characteristic for a specific user may include one or more specific frequency bandwidths and the hearing impairment degrees corresponding to those bandwidths for at least one or more specific altitudes. Also, the hearing characteristic for the user B includes hearing impairment degrees of about 10 dB and 20 dB, respectively, for two frequency bandwidths, i.e., 1.5-2 KHz and 3-4 KHz, at the altitude of 500 m. The table may include two and more frequency bandwidths for a specific altitude, and corresponding hearing impairment degrees.

TABLE 1

| User | Altitude (m) | Frequency Bandwidth (KHz) | Hearing Impairment Degree (dB) |
|---|---|---|---|
| User A | 300 m | 1-1.3 KHz | 5 dB |
|  | 500 m | 2-2.5 KHz | 15 dB |
| User B | 500 m | 1.5-2 KHz | 10 dB |
|  |  | 3-4 KHz | 20 dB |

In addition, the storage unit 307 stores atmospheric pressures of the terminal measured by the atmospheric pressure measuring unit 306. The stored atmospheric pressures are also sequentially stored at each measured time. Further, the storage unit 307 stores a hearing characteristic or information on the hearing characteristic for one or more users or a specific user that has passed user authentication. In more detail, the information for the user's hearing characteristic includes an atmospheric pressure affecting the user's hearing impairment or auditory impairment, at least one or more specific frequency bandwidths affecting the user's hearing impairment based on the atmospheric pressure, and a degree or level of hearing impairment indicated by a specific dB value, which corresponds to the at least one or more specific frequency bandwidths.

For example, as illustrated in Table 2, the hearing characteristics for the users stored in the storage unit 307 is individually classified and stored for each atmospheric pressure difference, frequency bandwidth, and hearing impairment degree for the hearing characteristic divided for each user. In other words, the hearing characteristic for the user A is specified by the specific frequency bandwidth 1-1.5 KHz at the atmospheric pressure difference 10 mb, and the hearing impairment degree 7 dB corresponding to the specific frequency bandwidth 1-1.5 KHz. The hearing characteristics are also specified by the specific frequency bandwidth 2-2.3 KHz at the atmospheric pressure difference 15 mb, and the hearing impairment degree 12 dB corresponding to the specific frequency bandwidth 2-2.3 KHz.

In this manner, the hearing characteristic for the specific user may include one or more specific frequency bandwidths and the hearing impairment degrees corresponding to those bandwidths for at least one or more atmospheric pressure differences. Also, the hearing characteristic for the user B may be specified by hearing impairment degrees of 8 dB and 20 dB, respectively, for two frequency bandwidths, i.e., 1.5-2 KHz and 3-3.5 KHz, at the atmospheric pressure difference 8 mb. The table may also include two and more frequency bandwidths for a specific atmospheric pressure difference, and hearing impairment degrees corresponding to those bandwidth, respectively.

TABLE 2

| User | Atmospheric Pressure Difference (mb) | Frequency Bandwidth (KHz) | Hearing Impairment Degree (dB) |
|---|---|---|---|
| User A | 10 mb | 1-1.5 KHz | 7 dB |
|  | 15 mb | 2-2.3 KHz | 12 dB |
| User B | 8 mb | 1.5-2 KHz | 8 dB |
|  |  | 3-3.5 KHz | 20 dB |

In addition, the storage unit 307 stores a hearing characteristic or information on the hearing characteristic for one or more user or a specific user that has passed user authentication. The information for the user's hearing characteristic includes a specific altitude affecting the user's hearing impairment or auditory impairment, a specific atmospheric pressure difference corresponding to the user's hearing impairment based one the specific altitude, at least one or more specific frequency bandwidths affecting the user's hearing impairment based on the specific altitude and/or specific atmospheric pressure, and a degree or level of hearing impairment indicated by a specific dB value, which corresponds to the at least one or more specific frequency bandwidths. In other words, the hearing characteristic of a user based on altitude and atmospheric pressure are stored.

Further, the user's hearing characteristic stored in the storage unit 307 may be stored directly from the user through the input unit 303. Also, the user of the navigation apparatus 300 may pass through a user's authentication process. The navigation apparatus 300 can then receive information on the relevant user's hearing characteristic pre-stored in an information providing center 500, and store the information on the pre-stored relevant user's hearing characteristic (hearing characteristic based on altitude and/or atmospheric pressure) in the storage unit 307.

In addition, the display unit 308 displays image information or road guide map included in the road guide information generated by the controller 310. Also, the display unit 308 may be a touch screen. Furthermore, the road guide information may include various information associated with driving a vehicle such as traffic lane information, driving speed limit information, turn-by-turn information, traffic safety information, vehicle information, road search information, and the like as well as map data.

When displaying the image information, the display unit 308 can display various contents such as menu screens, road guide information, and the like, using user interfaces and/or graphic user interfaces included in the storage unit 307. The contents displayed on the display unit 308 include various text or image data (including map data or various information data), and menu screens including icons, list menus, combo boxes, and the like. Further, the audio output unit 309 outputs voice information or voice messages for road guide information included in the road guide information generated by the controller 310. The audio output unit 309 in one embodiment is a speaker.

Further, the controller 310 generates road guide information based on the matched map information, and outputs the generated road guide information to the display unit 308 and audio output unit 309. The display unit 308 also displays the road guide information. In addition, real-time traffic information is received from the information providing center 500 connected through the controller 310 and a wired/wireless communication network 400. The received real-time traffic information is then used to generate the road guide information. The controller 310 is also connected with a call center 600 through the communication unit 311 to perform a phone call, and transmit or receive information between the navigation apparatus 300 and the call center 600. In one embodiment, the communication unit 311 is a hands-free module having a Bluetooth function using a short-range wireless communication method.

In addition, the controller 310 performs a path search based on the departure and destination points or the destination point, and displays the path search result on the display unit 308. Also, when the relevant POI information or road is selected for any POI information or any road of the map data being displayed on the display unit 308 through the input unit 303, the controller 310 can display the detailed information for the selected relevant information or road on the display unit 308. Furthermore, when the map data is displayed on the display unit 308 based on the generated road guide information, the controller 310 can control the display unit 308 to display a current location of the terminal on the map data.

In addition, the controller 310 controls the input unit 303, the altitude measuring unit 305, the atmospheric pressure measuring unit 306, the display unit 308, and the audio output unit 309 to perform an examination of the predetermined hearing characteristic for a user, and obtains hearing characteristic information for the relevant user based on the examination result of the predetermined hearing characteristic to store the obtained hearing characteristic information for the relevant user in the storage unit 307. Further, when performing an examination of the predetermined hearing characteristic, the condition of the predefined altitudes (for example, 100 m, 200 m, 300 m, 400 m, or the like) based on a current altitude of the navigation apparatus 300 is used to examine the user's hearing characteristic at the specific altitudes, or the condition of the predefined atmospheric pressure differences based an atmospheric pressure difference from the previous location (or previous altitude) of the navigation apparatus 300 is used to examine the user's hearing characteristic at the specific atmospheric pressures.

The controller 310 can also transmit the hearing characteristic information for the specific user (or relevant user) to the information providing center 500. Furthermore, when generating road guide information including voice information or image information based on the map information (or map matching result) matched by the map matching unit 304, the controller 310 generates candidate road guide information including voice information or image information based on the matched map information, and measures a current altitude of the terminal through the altitude measuring unit 305. Furthermore, the controller 310 extracts the relevant user's hearing characteristic pre-stored in the storage unit 307, which corresponds to a current altitude of the terminal. The extracted relevant user's hearing characteristic includes a specific frequency bandwidth based on the relevant altitude and a degree of hearing impairment indicated by a specific dB, which corresponds to the specific frequency bandwidth.

Furthermore, the controller 310 checks whether or not a specific frequency bandwidth included in the extracted relevant user's hearing characteristic is included in voice information included in the generated candidate road guide information, and when the specific frequency bandwidth is included in the voice information within the generated candidate road guide information, the controller 310 compensates voice information corresponding to the specific frequency bandwidth among the voice information within the generated candidate road guide information by the specific dB included in the extracted relevant user's hearing characteristic.

In other words, when the specific frequency of the user's pre-stored hearing characteristic is included in the voice information within the generated candidate road guide information, the controller 310 compensates voice information corresponding to the specific frequency bandwidth among the candidate road guide information by the specific dB. Furthermore, the controller 310 generates resultant road guide information including voice information or image information based on the candidate road guide information, compensates or amplifies the voice information (or a voice signal) by a specific dB for the specific frequency bandwidth based on altitude, and outputs the generated road guide information through the display unit 308 and/or audio output unit 309.

In this manner, when generating road guide information including voice information or image information, the voice information corresponding to a specific frequency bandwidth pre-stored based on a current altitude of the terminal is amplified by the preset dB, and the amplified voice information is provided to the user. Thus, the user having hearing loss can solve the relevant hearing loss problem, thereby enhancing the user's convenience.

In addition, when receiving s signal through the input unit 303 such as a microphone, the controller 310 measures a current altitude of the terminal through the altitude measuring unit 305. Furthermore, the controller 310 extracts the relevant user's hearing characteristic pre-stored in the storage unit 307, which corresponds to a current altitude of the terminal. As discussed above, the extracted relevant user's hearing characteristic may include a specific frequency bandwidth based on the relevant altitude and a degree of hearing impairment indicated by a specific dB, which corresponds to the specific frequency bandwidth. Furthermore, the controller 310 checks whether or not at least one or more specific frequency bandwidths included in the extracted relevant user's hearing characteristic are included in the input signals, and when the at least one or more specific frequency bandwidths are included in the input signals, the controller 310 compensates a signal corresponding to each of the at least one or more specific frequency bandwidths among the input signals by a specific dB included in the extracted relevant user's hearing characteristic.

In other words, when at least one or more specific frequencies of the user's pre-stored hearing characteristic are included in the input signals, the controller 310 compensates each signal corresponding to the at least one or more specific frequencies bandwidth among the input signals by the specific dB. Furthermore, the controller 310 outputs the input signal compensated or amplified by the specific dB through the display unit 308 and/or audio output unit 309.

Further, the controller 310 amplifies voice information or a signal corresponding to the specific frequency bandwidth included in voice information or input signals of the road guide information by a specific dB within the extracted hearing characteristic, when generating road guide information for voice information or any input signals included in the road guide information by using hearing characteristic extracted from the storage unit 307 based on an atmospheric pressure difference between the current location of the terminal and the previous location thereof (or between the current altitude and the previous altitude), and when at least one or more specific frequency bandwidths within the extracted hearing characteristic are included in voice information or any input signals of the road guide information. The controller 310 then generates road guide information or a new input signal based on the amplified signal and outputs the information through the display unit 308 and/or audio output unit 309.

Furthermore, when generating road guide information or processing input signals, the controller 310 can provide a screen in which a normal mode (for example, a typical functional mode for which a hearing compensation based on altitude is not performed) or a hearing compensation mode based on altitude or atmospheric pressure difference. The mode can then be selected by the user using a user interface or graphic user interface. Voice commands can also be used to select different modes. The controller 310 also generates the road guide information or processes input signals based on the normal mode or the hearing compensation mode selected by the user.

In addition, a part or all of the components including the GPS receiver 301, the dead-reckoning (DR) sensor 302, the input unit 303, the map matching unit 304, the altitude measuring unit 305, the atmospheric pressure measuring unit 306, the storage unit 307, the display unit 308, the audio output unit 309, the controller 310, and the communication unit 311, which are provided in the navigation apparatus 300 as illustrated in FIG. 3, may be substituted by components having similar functions in the mobile terminal 100.

For example, the GPS receiver 301 may be substituted by the position-location information module 115 of the mobile terminal 100, the DR sensor 302 may be substituted by the sensing unit 140 of the mobile terminal 100, the input unit 303 may be substituted by the user input unit 130 of the mobile terminal 100, the storage unit 307 may be substituted by the memory 160 of the mobile terminal 100, the display unit 308 may be substituted by the display unit 151 of the mobile terminal 100, the audio output unit 309 may be substituted by the audio output module 152 of the mobile terminal 100, and the communication unit 311 may be substituted by the wireless communication unit 110 of the mobile terminal 100. Also, the functions of the map matching unit 304 and the controller 310 may be executed by the controller 180 of the mobile terminal 100. Alternatively, the functions of the map matching unit 304 and the controller 310 may be implemented as an independent module in the mobile terminal 100.

Furthermore, a part or all of the components including the GPS receiver 301, the dead-reckoning (DR) sensor 302, the map matching unit 304, the altitude measuring unit 305, the atmospheric pressure measuring unit 306, the storage unit 307, the display unit 308, the audio output unit 309, the controller 310, and the communication unit 311, which are provided in the navigation apparatus 300 as illustrated in FIG. 3, may be substituted by components having similar functions in the telematics terminal 200. For example, the GPS receiver 301 may be substituted by the GPS module 202 of the telematics terminal 200, the DR sensor 302 may be substituted by the Gyro sensor 203 of the telematics terminal 200, the storage unit 307 may be substituted by the memory 224 of the telematics terminal 200, the display unit 308 may be substituted by the LCD 211 of the telematics terminal 200, the audio output unit 309 may be substituted by the amplifier 254 of the telematics terminal 200, and the communication unit 311 may be substituted by the communication module 201 of the telematics terminal 200. Also, the functions of the map matching unit 304 and the controller 310 may be executed by the central processing unit 222 of the telematics terminal 200. Alternatively, the functions of the map matching unit 304 and the controller 310 may be implemented as an independent module in the telematics terminal 200.

Thus, when generating road guide information, the user's pre-stored hearing characteristic based on altitude can be used to generate road guide information compensated by the relevant user's hearing characteristic based on altitude, or the user's pre-stored hearing characteristic based on altitude can be compensated for input signals to output the compensated input signals, thereby enhancing the user's convenience.

Figure 4:
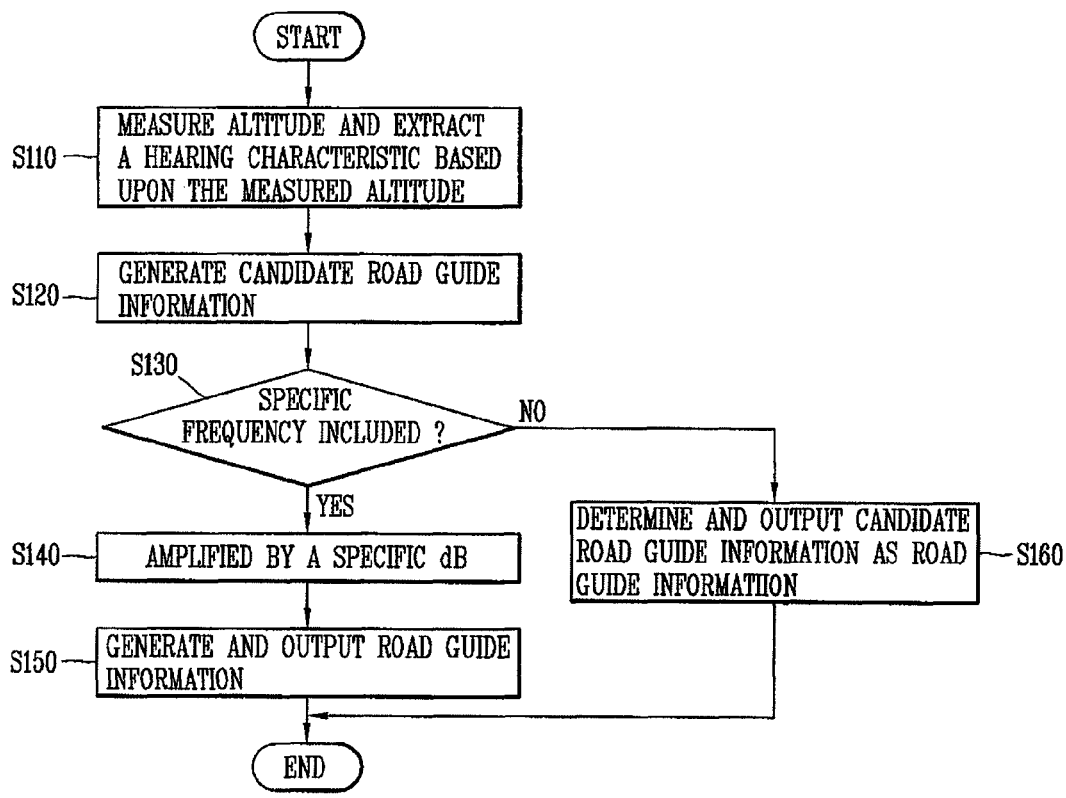
FIG. 4 is a flow chart illustrating a method of controlling a navigation apparatus according to a first embodiment of the present invention.

Next, FIG. 4 is a flow chart illustrating a navigation method according to a first embodiment of the present invention. FIG. 3 will also be referred to throughout the rest of the description of the present invention. As shown in FIG. 4, the altitude measuring unit 305 measures a current altitude of the navigation apparatus 300 based on its location, and the controller 310 extracts a hearing characteristic corresponding to the altitude from the user's hearing characteristics pre-stored in the storage unit 307 based on the current altitude of the navigation apparatus 300 (S110).

Further, when extracting a hearing characteristic corresponding to the measured altitude, the controller 310 checks which characteristic includes the measured altitude among a plurality of altitudes pre-stored in the storage unit 307 reflecting the user's preset tolerance, and selects the relevant altitude. That is, the controller 310 extracts a hearing characteristic including an altitude, at least one or more specific frequency bandwidths, and a specific dB corresponding to the at least one or more specific frequency bandwidths for the selected relevant altitude.

As an example, and referring to the user A in Table 1, assume the preset tolerance is ±5%, the altitude measured by the altitude measuring unit 305 is 480 m, and the plurality of altitudes pre-stored in the storage unit 307 for the user A are 300 m and 500 m. The recognizable ranges or allowable tolerances of the altitudes are thus 285-315 m and 475-525 m (assuming a tolerance of ±5%). Then, the controller 310 determines how the measured altitude 480 m corresponds to the recognizable ranges or allowable tolerances. In this example, the controller 310 determines the measured altitude 480 m is included in the range of 475-525 m, and therefore extracts the hearing characteristic for the altitude 500 m, which includes a frequency bandwidth 2-2.5 KHz and hearing impairment degree of 15 dB.

As another example, assume the tolerance preset by a specific user is ±10%, the measure altitude is 305 m, and the altitudes pre-stored in the storage unit 307 are 300 m and 320 m. Thus, the recognizable ranges of the altitudes (300 m and 320 m) are 270-330 m and 288-352 m, respectively (assuming a tolerance of 10%). In this example, the controller 310 determines the measured altitude 305 m is included in both of the recognizable ranges.

Therefore, in one embodiment, the controller 310 selects an altitude having a smaller difference value from the plurality of pre-stored altitudes 300 m and 320 m for the measured altitude 305 m (for example, the controller 310 selects an altitude 300 m having a smaller difference value from the pre-stored altitudes 300 m and 320 m), and extracts characteristic information corresponding to the selected altitude. Alternatively, the controller 310 can display the plurality of altitudes including the measured altitude, prompt the user to select one of the displayed altitudes, and extract characteristic information corresponding to the relevant altitude selected by the user. Also, the tolerance preset by the user may be set with any specific value for a specific user, or individual tolerances may be set for each altitude and/or frequency bandwidth.

In addition, among the hearing characteristics for a plurality of users pre-stored in the storage unit 307, the controller 310 can perform an authentication process or checking process for a current user of the navigation apparatus 300, and extract a hearing characteristic for the current user among the hearing characteristics for the plurality of users pre-stored in the storage unit 307. In addition, when there exists no altitude corresponding to the measured current altitude among the user's hearing characteristic pre-stored in the storage unit 307, the controller 310 can generate a typical road guide information.

Further, as discussed above, the map matching unit 304 generates a first location data and/or a second location data based on each signal received by the GPS receiver 301 and/or DR sensor 302, and generates an estimated location based on the generated first and second location data. Then, the controller 310 reads map data corresponding to a driving path from the storage unit 307. Further, the driving path may be a driving path from the departure point to the destination point, or a driving path without selecting the destination point. In addition, for the location-based technology, GPS information corresponding to a signal received by the source device 110 is mainly used, but a hybrid positioning system can be used in which both cell tower signal triangulation and Wi-Fi positioning information are used in addition to the GPS information.

The map matching unit 304 also matches the estimated location with a link (road) included in the map data, and outputs the matched map information (map matched result) to the controller 310. For example, the map matching unit 304 generates an estimated location based on the first and second location data, and matches the generated estimated location with links within the map data stored in the storage unit 307 based on the link sequence thereof, and outputs the matched map information (map-matched result) to the controller 310. Also, the matched map information (map-matched result) is generated with reference to preset user information, road conditions using transport protocol expert group (hereinafter, 'TPEG') information, current vehicle status information (including gas level, tire inflation pressure status, etc.), and the like.

Also, as shown in FIG. 4, the controller 310 generates candidate road guide information or supplementary road guide information based on the matched map information (S120). Further, the step of measuring the current altitude of the terminal and extracting the hearing characteristic of the relevant user based on the measured altitude (S110) and the step of generating the road guide information (S120) may be processed in a reversed order. In other words, it is possible to generate the road guide information, and then measure the current altitude of the terminal and extract the hearing characteristic of the relevant user based on the measured altitude.

Further, the controller 310 checks whether or not a specific frequency bandwidth included in the user's hearing characteristic extracted from the storage unit 307 is included in voice information (or frequency bandwidths of the voice information) within the generated candidate road guide information (S130). When the specific frequency bandwidth is included in the voice information within the generated candidate road guide information (Yes in S130), the controller 310 amplifies the voice information by a specific dB included in the user's extracted hearing characteristic (S140).

Figure 5A:
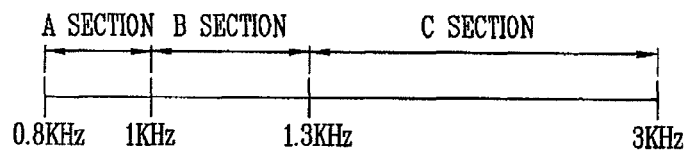
FIGS. 5A and 5B are overviews illustrating a frequency bandwidth of road guide information according to a first embodiment of the present invention.

For example, as illustrated in FIG. 5A, when the contents of Table 1 are stored in the storage unit 307, the tolerance for the user A is ±5%, the current measured altitude of the terminal is 310 m, and the voice information included in the generated candidate road guide information uses the frequency bandwidth of 0.8-3 KHz (including A, B, and C sections), the controller 310 extracts characteristic information corresponding to the altitude 300 m disclosed in Table 1 from the storage unit 307. Then, the controller 310 checks whether or not the frequency bandwidth (1-1.3 KHz) within the extracted characteristic information is included in the frequency bandwidth (0.8-3 KHz) of the voice information within the generated candidate road guide information.

When the frequency bandwidth (1-1.3 KHz) within the extracted characteristic information (which corresponds to the B section) is included in the frequency bandwidth (0.8-3 KHz) of the voice information within the generated candidate road guide information, the controller 310 amplifies voice information corresponding to the specific frequency bandwidth 1-1.3 KHz (voice information corresponding to the B section) included in the voice information of the candidate road guide information by 5 dB, which is a hearing impairment degree included in the extracted characteristic information.

Then, as shown in FIG. 4, the controller 310 generates and outputs road guide information including the amplified voice information or image information to the display unit 308 and/or audio output unit 309 (S150). In addition, the display unit 308 and/or audio output unit 309 may be configured as a single device, for example, an output unit (not shown). Furthermore, and as discussed above, the generated road guide information can include map data, POI information, traffic lane information, driving speed limit information, turn-by-turn list information, and the like.

Figure 5B:
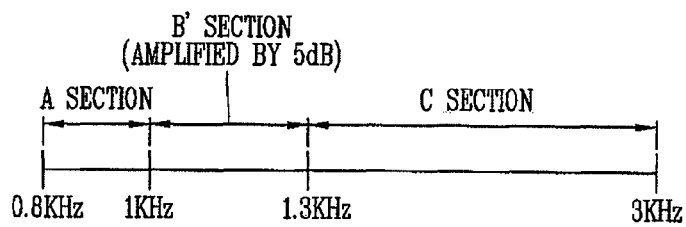

As another example illustrated in FIG. 5B, the controller 310 generates and outputs road guide information using the amplified voice information (a signal amplified by 5 dB over the B section of the frequency bandwidth 1-1.3 KHz) and does not amplify the A and C sections of the frequency bandwidths 0.8-1 KHz and 1.3-3 KHz. Thus, the voice information included in the generated road guide information uses a frequency bandwidth 0.8-3 KHz, and the frequency bandwidth 1-1.3 KHz within that bandwidth is a signal amplified by 5 dB when compared to the original voice information signal of the candidate road guide information.

As shown in FIG. 4, when the specific frequency bandwidth is not included in the voice information within the generated candidate road guide information (No in S130), the controller 310 determines the candidate road guide information including voice information or image information as resultant road guide information, and outputs the determined road guide information to the display unit 308 and/or audio output unit 309 (S160).

Figure 6:
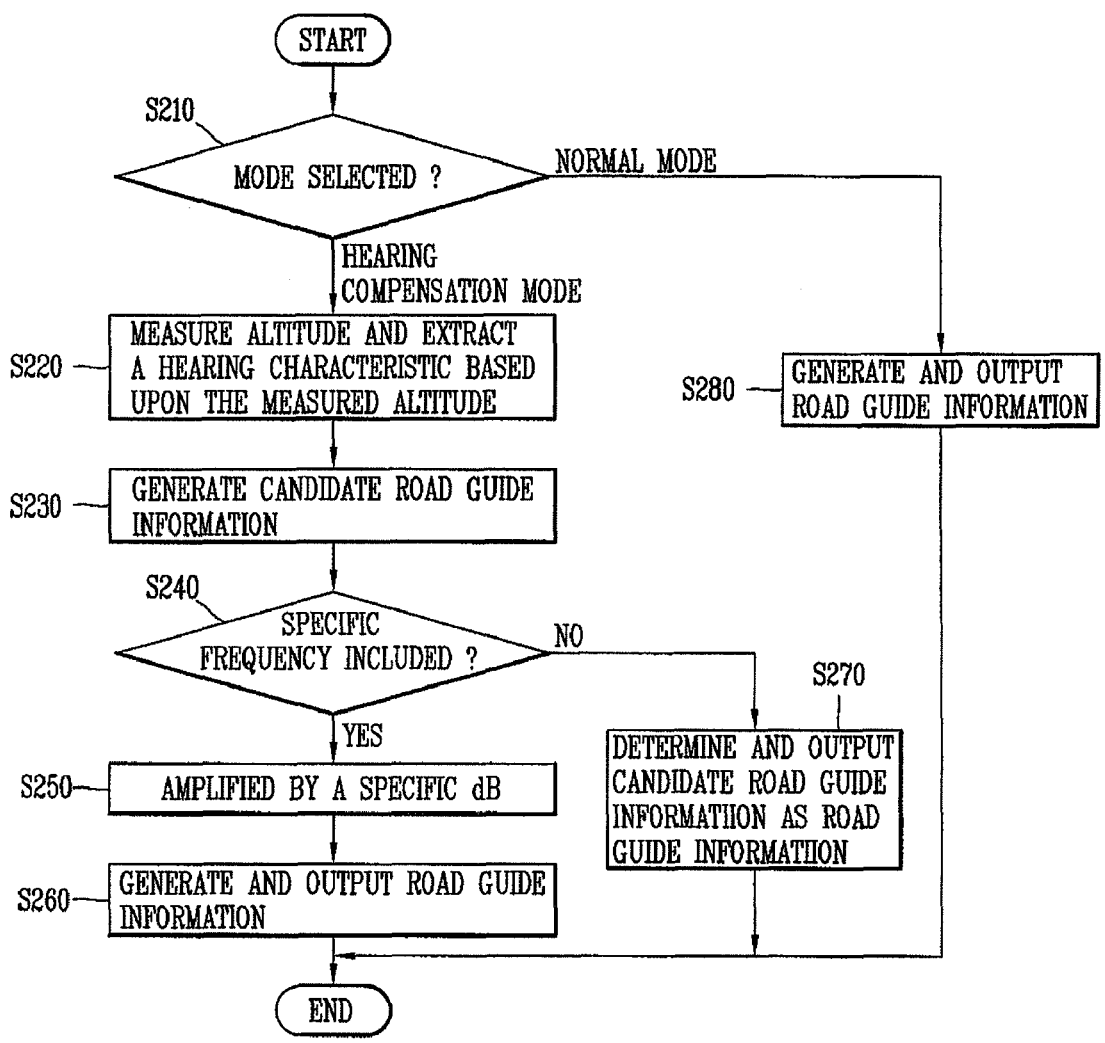
FIG. 6 is a flow chart illustrating a method of controlling a navigation apparatus according to a second embodiment of the present invention.

Next, FIG. 6 is a flow chart illustrating a navigation method according to a second embodiment of the present invention. Note that steps S220-S270 in FIG. 6 are similar to steps S110-S160 in FIG. 4 and thus a detailed description of steps S220-S270 will not be repeated. FIG. 6 illustrates an additional feature in which the user can select a normal mode or a hearing compensation mode. In particular, the controller 310 outputs a screen and/or voice signal for mode selection to the display unit 308 and/or audio output unit 309 using a user interface or graphic interface (S210). The modes are a 'normal mode' generating typical road guide information, and a 'hearing compensation mode' generating road guide information compensated by a specific user's hearing characteristic based on altitude.

When the hearing compensation mode generating road guide information compensated by the user's hearing characteristic based on altitude is selected by the user, the altitude measuring unit 305 measures a current altitude of the navigation apparatus 300 based on its location. Then, the controller 310 extracts a hearing characteristic corresponding to the altitude among the user's hearing characteristics pre-stored in the storage unit 307 based on the measured current altitude of the navigation apparatus 300 (S220).

The controller 310 then generates and outputs candidate road guide information (or supplementary road guide information) based on the matched map information (S230). The controller 310 also checks whether or not a specific frequency bandwidth included in the extracted user's hearing characteristic based on the measured current altitude of the navigation apparatus 300 is included in voice information (or frequency bandwidths of the voice information) included in the generated candidate road guide information (S240).

When the specific frequency bandwidth is included in the voice information within the generated candidate road guide information (Yes in S240), the controller 310 amplifies voice information corresponding to the specific frequency bandwidth (or voice information corresponding to the pre-stored specific frequency bandwidth among the voice information of the candidate road guide information) by a specific dB included in the extracted user's hearing characteristic based on the current altitude of the terminal (S250).

The controller 310 then generates and output road guide information including voice information or image information based on the amplified voice information and the candidate road guide information including voice information or image information to the display unit 308 and/or audio output unit 309 (S260). When the specific frequency bandwidth is not included in the voice information within the generated candidate road guide information (No in S240), the controller 310 determines the candidate road guide information including voice information or image information as resultant road guide information including voice information or image information, and outputs the determined road guide information to the display unit 308 and/or audio output unit 309 (S270).

In addition, when a normal mode is selected by the user at the step S210, the controller 310 generates and outputs road guide information including voice information or image information based on matched map information to the display unit 308 and/or audio output unit 309 (S280).

According to this embodiment of the present invention, a mode is selected by the user (S210), and then the hearing compensation mode (S220-S270) or the normal mode (S280) is performed based on the mode selection result. However, the processes of selecting a mode and generating road guide information compensated by the user's hearing characteristic reflecting altitude based on the mode is not limited to this embodiment of the present invention, and various modifications can be made by the user.

Figure 7:
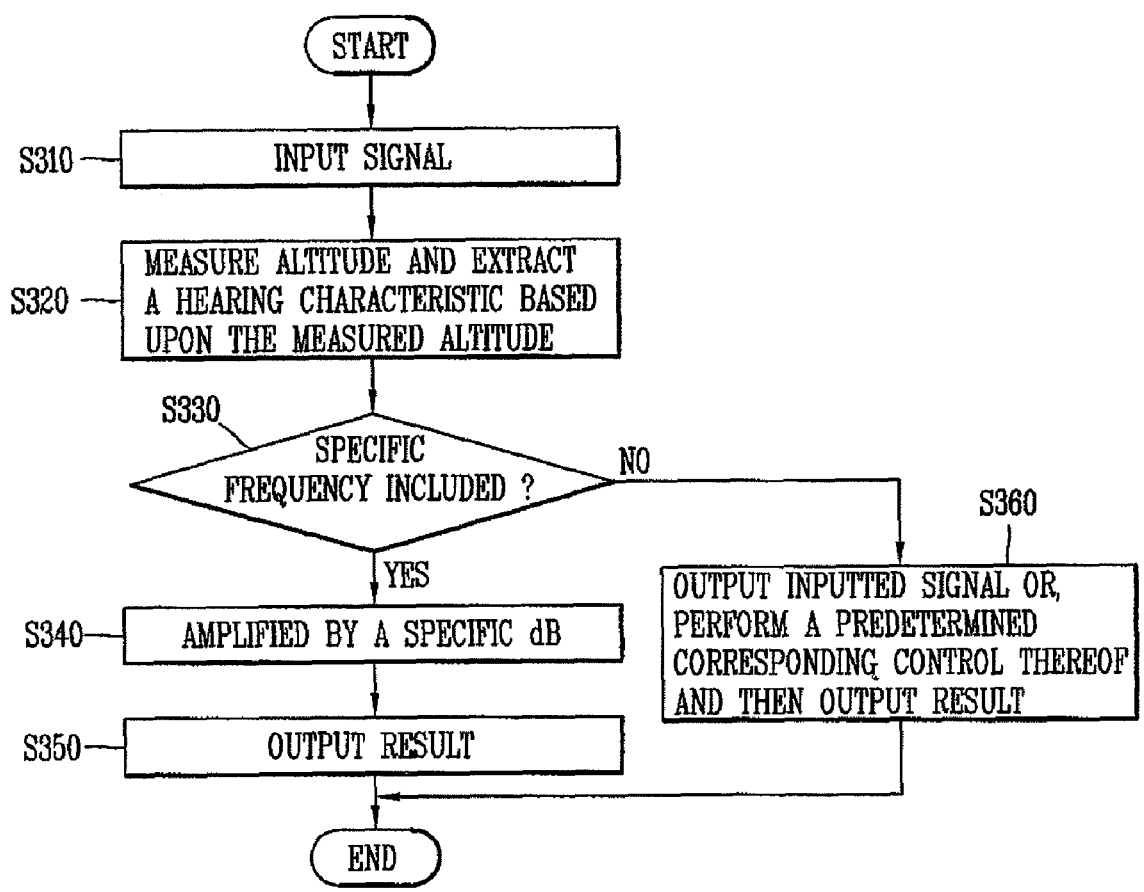
FIG. 7 is a flow chart illustrating a method of controlling a navigation apparatus according to a third embodiment of the present invention.

Next, FIG. 7 is a flow chart illustrating a navigation method according to a third embodiment of the present invention. Note that steps S320-S340 in FIG. 7 are similar to steps S110, S130 and S140 in FIG. 4, respectively, and thus a detailed explanation will be omitted. As shown, the controller 310 receives a signal through a microphone provided in the input unit 303 (S310). The altitude measuring unit 305 then measures a current altitude of the navigation apparatus 300 based on its location, and the controller 310 extracts a hearing characteristic corresponding to the measured altitude among the user's hearing characteristics pre-stored in the storage unit 307 (S320).

Further, the controller 310 checks whether or not a specific frequency bandwidth included in the extracted user's hearing characteristic is included in the input signal (S330). When the specific frequency bandwidth is included in the input signal (Yes in S330), the controller 310 amplifies a signal corresponding to the specific frequency bandwidth included in the input signal (or a signal corresponding to the specific frequency bandwidth within the extracted hearing characteristic from the input signal) by a specific dB included in the extracted user's hearing characteristic based on the current altitude of the terminal (S340).

The controller 310 then generates and output a new input signal using part of the amplified signal and the input signal to the audio output unit 309 (S350). The controller 310 can also perform a predetermined control based on the amplified signal and the input signal, and output the performed result through the display unit 308 and/or audio output unit 309.

Also, when a specific frequency bandwidth within the extracted user's hearing characteristic is not included in the input signal (No in S330), the controller 310 performs a predetermined typical signal processing operation, and then outputs the input signal to the audio output unit 309. The controller 310 can also perform a predetermined control based on the input signal, and output the performed result through the display unit 308 and/or audio output unit 309.

Figure 8:
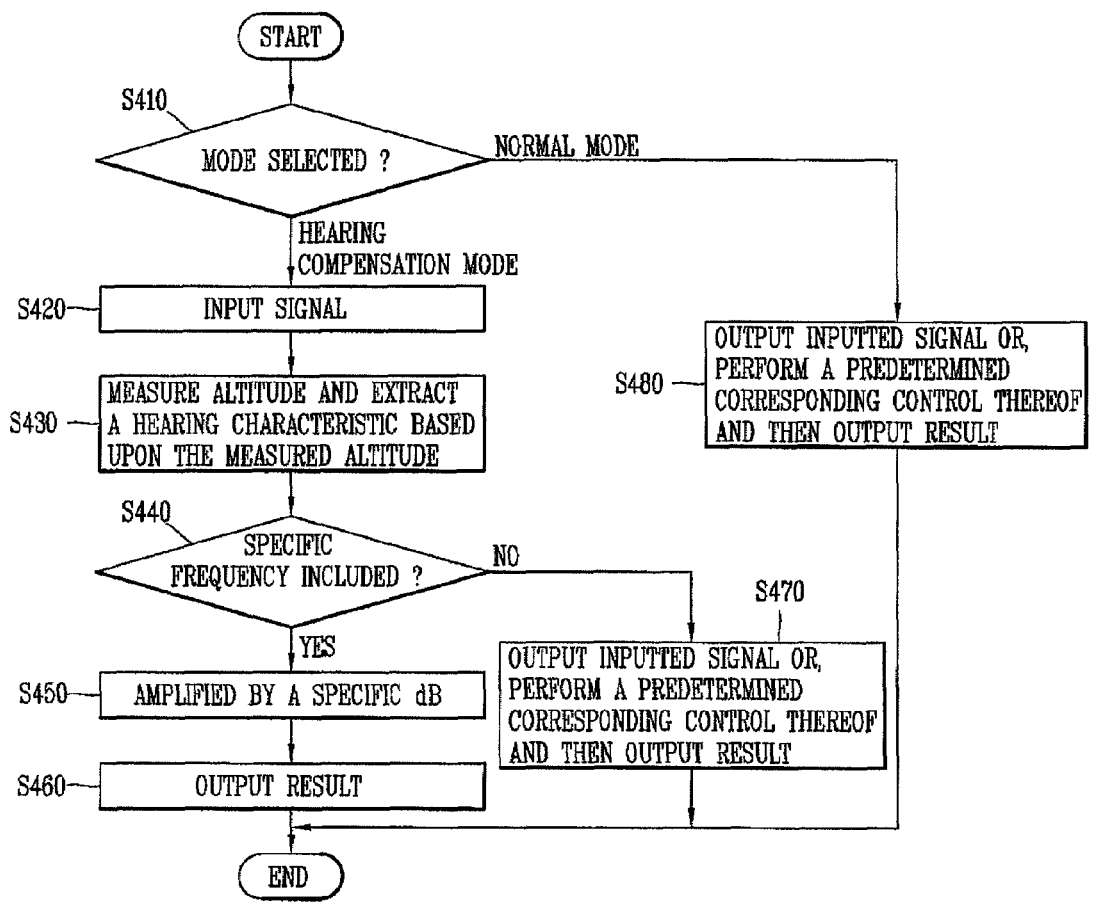
FIG. 8 is a flow chart illustrating a method of controlling a navigation apparatus according to a fourth embodiment of the present invention.

Next, FIG. 8 is a flow chart illustrating a navigation method according to a fourth embodiment of the present invention. Note that steps S420-S470 in FIG. 8 are similar to steps S310-S360 in FIG. 7 and thus a detailed description of these steps will be omitted. FIG. 8 also includes the mode selection step, which was first shown in FIG. 6. In particular, the controller 310 outputs a screen and/or voice signal for mode selection to the display unit 308 and/or audio output unit 309 using a user interface or graphic interface (S410). In this embodiment, the mode is a 'normal mode' for normally outputting a signal, and a 'hearing compensation mode' for compensating an input signal based on altitude.

When the user selects the hearing compensation mode, the controller 310 then receives a signal through a microphone provided in the input unit 303 (S420). Further, the altitude measuring unit 305 measures a current altitude of the navigation apparatus 300 based on its location, and the controller 310 extracts a hearing characteristic corresponding to the altitude among the user's hearing characteristics pre-stored in the storage unit 307 based on the current measured altitude of the navigation apparatus 300 (S430).

When the controller 310 determines a specific frequency bandwidth included in the extracted user's hearing characteristic is included in the input signal (Yes in S440), the controller 310 amplifies a signal corresponding to the specific frequency bandwidth included in the input signal (or a signal corresponding to the specific frequency bandwidth within the extracted hearing characteristic from the input signal) by a specific dB included in the extracted user's hearing characteristic (S450).

The controller 310 then generates and outputs a new input signal using part of the amplified signal and the input signal (S460). In addition, the controller 310 can perform a predetermined control based on the amplified signal and the input signal, and output the performed result through the display unit 308 and/or audio output unit 309. Also, when the specific frequency bandwidth within the extracted user's hearing characteristic is not included in the input signal (No in S440), the controller 310 performs a predetermined typical signal processing, and then outputs the input signal to the audio output unit 309 (S470). The controller 310 can perform a predetermined control based on the input signal, and output the performed result through the display unit 308 and/or audio output unit 309.

In addition, when a normal mode is selected by the user at the step S410, the controller 310 performs a predetermined typical signal processing, and then outputs the input signal to the audio output unit 309 (S480). The controller 310 can perform a predetermined control based on the input signal and output the performed result through the display unit 308 and/or audio output unit 309.

According to this embodiment of the present invention, a mode is selected by the user (S410), and then the hearing compensation mode (S420-S470) or the normal mode (S480) is performed based on the selected mode. However, the processes of selecting a mode and generating an input signal compensated by the user's hearing characteristic reflecting altitude based on the mode is not limited to this embodiment of the present invention, and various modifications can be made by the user.

Figure 9:
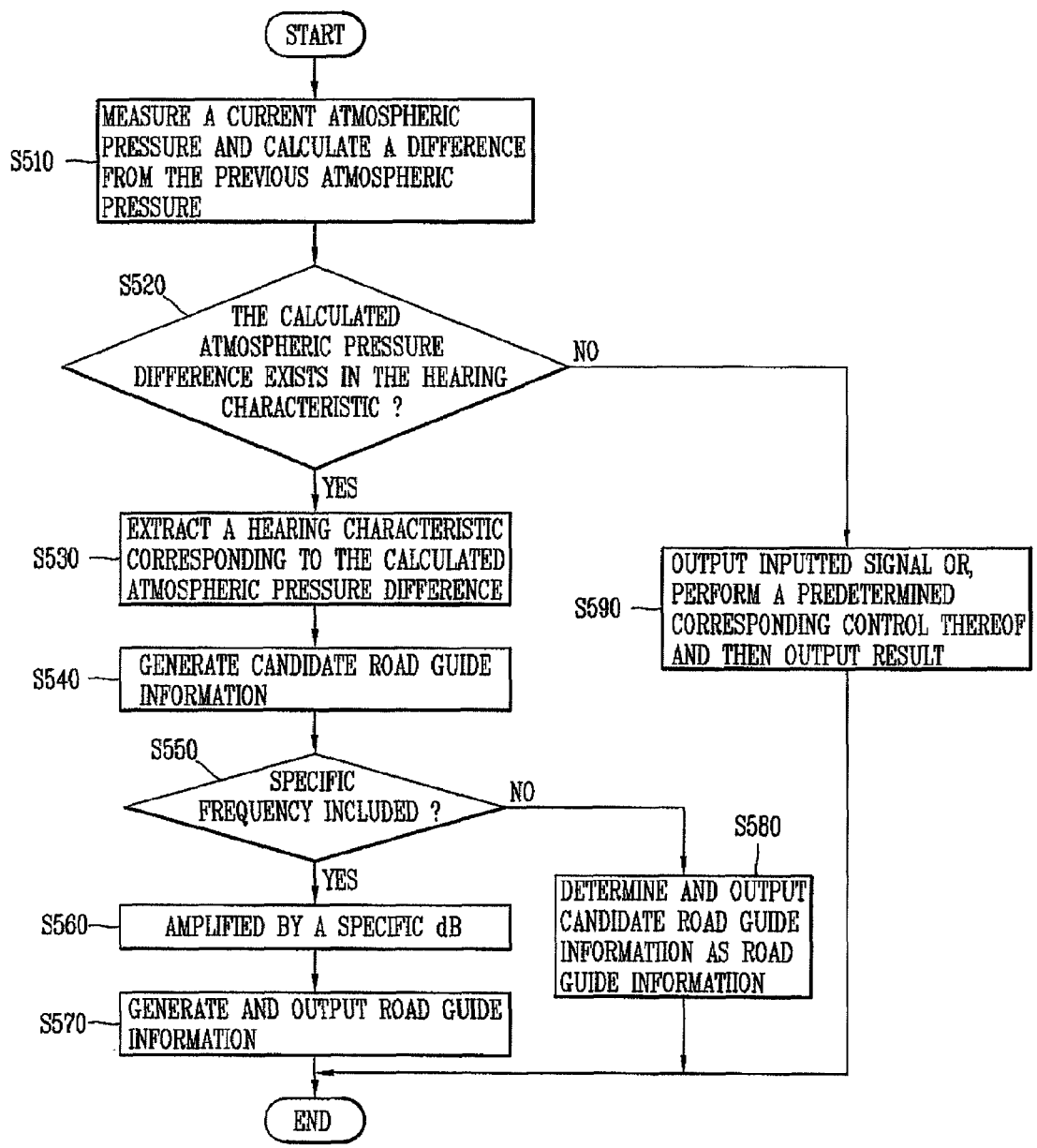
FIG. 9 is a flow chart illustrating a method of controlling a navigation apparatus according to a fifth embodiment of the present invention.

Next, FIG. 9 is a flow chart illustrating a navigation method according to a fifth embodiment of the present invention. As shown, the atmospheric pressure measuring unit 306 measures a first atmospheric pressure based on a current location of the navigation apparatus 300, and stores the measured atmospheric pressure in the storage unit 307. Further, the atmospheric pressure measurement may be performed at each preset time period, or when generating road guide information or receiving a signal.

The controller 310 also calculates a difference between the first atmospheric pressure based on the current location of the terminal (or the navigation apparatus 300) and a previously measured atmospheric pressure (or second atmospheric pressure) (S510). The controller 310 also determines whether or not the calculated atmospheric pressure difference exists among the stored user's hearing characteristic (S520).

When the calculated atmospheric pressure difference exists within the user's hearing characteristic pre-stored in the storage unit 307 (Yes in S520), the controller 310 extracts a hearing characteristic corresponding to the calculated atmospheric pressure difference from the pre-stored hearing characteristics (S530). Also, when extracting a hearing characteristic corresponding to the calculated atmospheric pressure difference, the controller 310 determines which one corresponds to the calculated atmospheric pressure difference among a plurality of atmospheric pressure differences pre-stored in the storage unit 307 reflecting the user's preset tolerance, selects the relevant atmospheric pressure difference, and extracts a hearing characteristic (including an atmospheric pressure difference, at least one or more specific frequency bandwidths, and a specific dB corresponding to the at least one or more specific frequency bandwidths) corresponding to the selected relevant atmospheric pressure difference.

As an example, referring to the User A in Table 2, when the preset tolerance is ±10%, a measured difference between the current and previous atmospheric pressures is 9.5 mb, and there are a plurality of atmospheric pressure differences pre-stored in the storage unit 307 for the user A (i.e., 10 mb and 15 mb), the recognizable ranges or allowable tolerances of the atmospheric pressure differences are 9-11 mb and 13.5-16.5 mb, respectively (assuming a tolerance of ±10%. Then, the controller 310 determines if the calculated atmospheric pressure difference of 9.5 mb corresponds to one of the plurality of atmospheric pressure differences within the recognizable range.

For this example, the controller 310 determines the calculated atmospheric pressure difference 9.5 mb is included in the range of 9-11 mb among the recognizable ranges and extracts the hearing characteristic having the atmospheric pressure difference of 10 mb, a frequency bandwidth of 1-1.5 KHz, and a hearing impairment degree of 7 dB among the hearing characteristics pre-stored in the storage unit 307 for the calculated atmospheric pressure difference 9.5 mb.

Further, when the calculated atmospheric pressure difference is included in at least two or more recognizable ranges, the controller 310 can select an atmospheric pressure difference having the smallest difference value from the pre-stored atmospheric pressure differences, and extract characteristic information corresponding to the selected atmospheric pressure difference. Alternatively, the controller 310 can display at least two or more atmospheric pressure differences including the calculated atmospheric pressure difference and allow the user to select any one of the at least two or more atmospheric pressure differences. The controller 310 then extracts characteristic information corresponding to the selected atmospheric pressure difference.

Also, the tolerance preset by the user may be set with any specific value for a specific user, or individual tolerances may be set for each atmospheric pressure difference and/or frequency bandwidth. In addition, among the hearing characteristics for a plurality of users pre-stored in the storage unit 307, the controller 310 can perform an authentication process or checking process for a current user of the navigation apparatus 300, and extract a hearing characteristic for the current user among the hearing characteristics for a plurality of users pre-stored in the storage unit 307 based on the performed result.

The controller 310 then generates candidate road guide information (or supplementary road guide information) based on matched map information (S540). The controller 310 also checks whether or not a specific frequency bandwidth included in the user's hearing characteristic extracted from the storage unit 307 based on a difference between the current and previous atmospheric pressures of the navigation apparatus 300 is included in voice information (or frequency bandwidths of the voice information) included in the generated candidate road guide information (S550).

When the specific frequency bandwidth difference is included in the voice information within the generated candidate road guide information (Yes in S550), the controller 310 amplifies voice information corresponding to the specific frequency bandwidth included in the voice information of the candidate road guide information (or voice information corresponding to the pre-stored specific frequency bandwidth among the voice information of the candidate road guide information) by a specific db based on the calculated atmospheric pressure difference (S560).

The controller 310 also generates and outputs road guide information including voice information or image information based on the amplified voice information and the candidate road to the display unit 308 and/or audio output unit 309 (S570). When the specific frequency bandwidth is not included in the voice information within the generated candidate road guide information (No in S550), the controller 310 determines the candidate road guide information including voice information or image information as resultant road guide information and outputs the determined road guide information to the display unit 308 and/or audio output unit 309 (S580). Note that steps S540-S580 are similar to steps S120-S160 in FIG. 4.

Also, when the calculated atmospheric pressure difference does not exist among a plurality of atmospheric pressure differences included in the hearing characteristic of a user pre-stored in the storage unit 307 (No in S520), the controller 310 generates and outputs typical road guide information to the display unit 308 and/or audio output unit 309 (S590).

Figure 10:
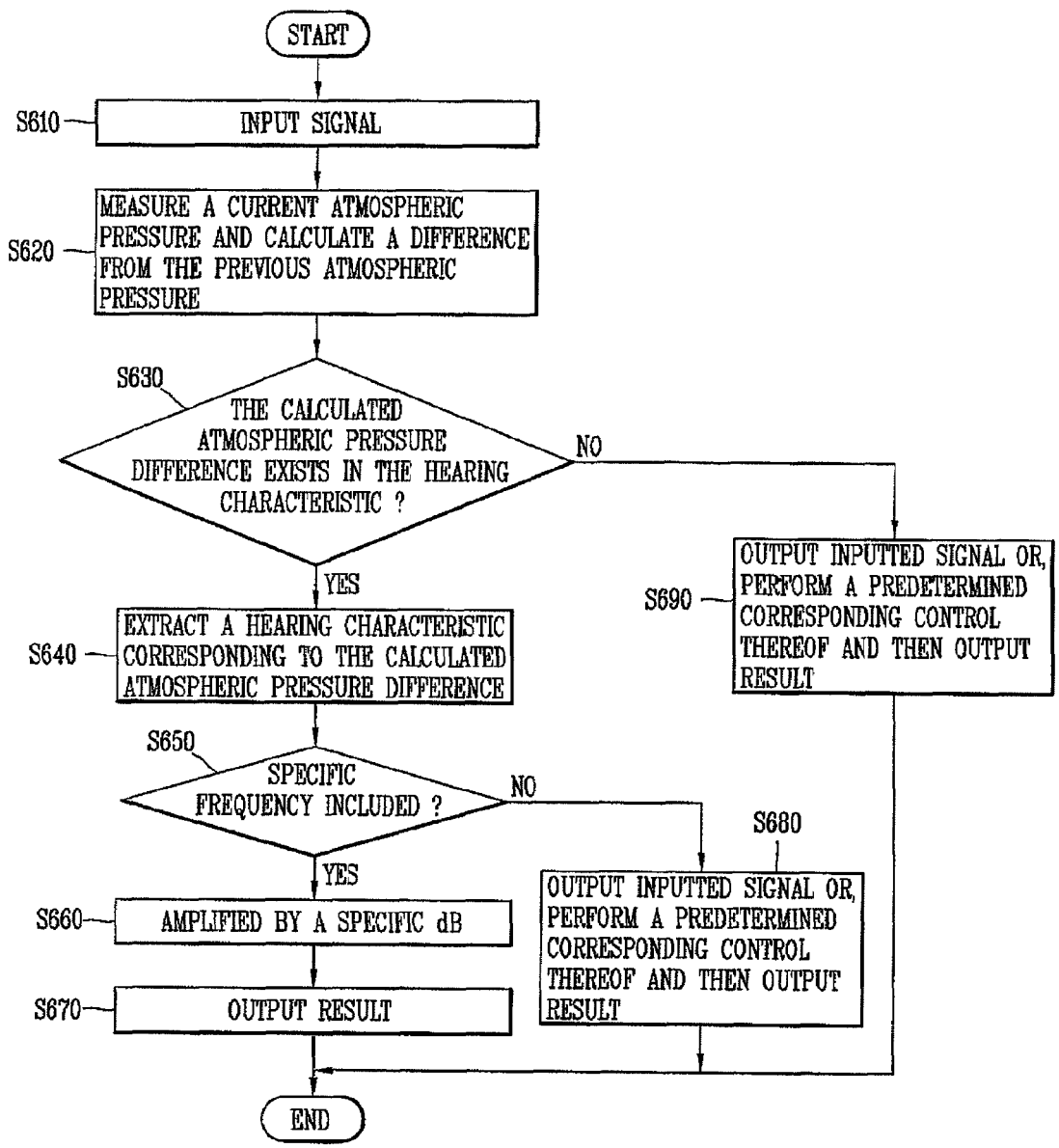
FIG. 10 is a flow chart illustrating a method of controlling a navigation apparatus according to a sixth embodiment of the present invention.

Next, FIG. 10 is a flow chart illustrating a navigation method according to a sixth embodiment of the present invention. Note that steps S620-S670 and S690 are similar to steps S510-S570 and S590 in FIG. 9, and thus a detailed description of these steps is omitted. As shown in FIG. 10, the controller 310 receives a signal through a microphone provided in the input unit 303 (S610). Further, the atmospheric pressure measuring unit 306 measures a first atmospheric pressure based on a current location of the navigation apparatus 300, and stores the measured atmospheric pressure in the storage unit 307. In addition, the atmospheric pressure measurement 306 may be performed at each preset time period, or when generating road guide information or receiving a signal.

The controller 310 also calculates a difference between the first atmospheric pressure based on the current location of the terminal (or the navigation apparatus 300) and a previously measured atmospheric pressure (or second atmospheric pressure) (S620). Further, the controller 310 determines whether or not an atmospheric pressure difference corresponding to the calculated atmospheric pressure difference exists among the user's hearing pre-stored in the storage unit 307 (S630). When the calculated atmospheric pressure difference exists within the user's hearing characteristic pre-stored in the storage unit 307 (Yes in S630), the controller 310 extracts a hearing characteristic corresponding to the calculated atmospheric pressure difference from the user's hearing characteristics pre-stored in the storage unit 307 (S640).

The controller 310 also determines whether or not a specific frequency bandwidth within the user's hearing characteristic extracted from the storage unit 307 is included in the input signal (S650). When the specific frequency bandwidth is included in the input signal (Yes in S650), the controller 310 amplifies a signal corresponding to the specific frequency bandwidth included in the input signal (or a signal corresponding to the specific frequency bandwidth within the extracted hearing characteristic among the input signal) by a specific dB included in the user's hearing characteristic extracted from the storage unit 307 based on the calculated atmospheric pressure difference (S660).

The controller 310 also generates and outputs a new input signal using part of the amplified signal and the input signal through the audio output unit 309 (S670). The controller 310 can also perform a predetermined control based on the amplified signal and the input signal, and output the performed result through the display unit 308 and/or audio output unit 309. When the specific frequency is not included (No in S650), the controller performs step S680, which outputs the unamplified signal (i.e., the input signal) or performs a predetermined operation on the input signal.

When the calculated atmospheric pressure difference does not exist among a plurality of atmospheric pressure differences included in the stored hearing characteristic (No in S630), the controller 310 performs a typical signal processing, and outputs the input signal to the audio output unit 309. The controller 310 can perform a predetermined control based on a signal input to the controller 310, and output the performed result through the display unit 308 and/or audio output unit 309.

In addition, when generating road guide information or processing input signals, in which the user's hearing characteristic is compensated based on the atmospheric pressure difference, the controller 310 can be additionally configured to have a function selecting a normal mode or hearing compensation mode by the user. Furthermore, the controller 310 can be configured by using altitude and atmospheric pressure differences at the same time in the user's hearing characteristic. In other words, the user's hearing characteristic may include at least one or more frequency bandwidths and hearing impairment degrees corresponding to those bandwidths for each altitude and atmospheric pressure difference. In this manner, it is possible to measure altitude and/or atmospheric pressure, and compensate hearing impairment (or auditory impairment) based on the user's pre-stored hearing characteristic based on the measured altitude and/or atmospheric pressure.

A navigation apparatus and method thereof according to embodiments of the present invention provide road guide information compensated by the user's hearing impairment characteristic based on altitude and/or atmospheric pressure thereby helping the user having a hearing impairment. Moreover, a navigation apparatus and method thereof according to embodiments of the present invention provide a signal compensated by the user's hearing impairment characteristic based on altitude and/or atmospheric pressure for the input signals (including voice signal) to the user, thereby helping the user having a hearing impairment.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method of controlling a navigation apparatus, the method comprising:
    measuring, via a sensor, an environmental characteristic including at least one of an altitude of the navigation apparatus and an atmospheric pressure of an atmosphere the navigation apparatus is operating in;
    extracting, via the controller, a hearing characteristic including a degree of hearing impairment for a user operating the navigation apparatus from a memory based on the measured environmental characteristic;
    compensating, via a controller, audio output by the navigation apparatus using the extracted degree of hearing impairment for the user operating the navigation apparatus; and
    outputting road guidance information informing the user about traveling directions including at least one of map information and the output audio.

2. The method of claim 1, wherein the hearing characteristic is pre-stored in the memory and includes a relationship between at least one of a specific altitude and a specific atmospheric pressure with respect to a frequency bandwidth and hearing impairment degree in decibels for the user such that the controller can extract a corresponding frequency bandwidth and hearing impairment degree for a measured altitude or atmospheric pressure.

3. The method of claim 2, wherein extracting the hearing characteristic comprises:
    searching, via the controller, the pre-stored hearing characteristic for an altitude or an atmospheric pressure corresponding to the measured altitude or atmospheric pressure, respectively, for the user operating the navigation apparatus;
    extracting, via the controller, a specific bandwidth of audio to be compensated that corresponds to the searched altitude or atmospheric pressure; and
    extracting, via the controller, the degree of hearing impairment corresponding to the extracted specific bandwidth.

4. The method of claim 3, wherein when the searching step determines there is more than one altitude or atmospheric pressure corresponding to the measured altitude or atmospheric pressure within a preset tolerance range for the user operating the navigation apparatus, the method further comprises selecting an altitude or atmospheric pressure from the pre-stored hearing characteristic that most closely matches the measured altitude or atmospheric pressure.

5. The method of claim 3, wherein the compensating step comprises:
    compensating only a portion of the audio output by the navigation apparatus that corresponds to the extracted specific frequency bandwidth.

6. The method of claim 2, wherein the pre-stored hearing characteristic includes a plurality of users, a plurality of specific altitudes for each user, a plurality of specific atmospheric pressures for each user, and a plurality of frequency bandwidths and hearing impairment degrees in decibels corresponding to the plurality of specific altitudes and atmospheric pressures.

7. The method of claim 1, further comprising:
authenticating that the user operating the navigation apparatus is an authorized user to receive the compensated audio output by the navigation apparatus.

8. The method of claim 1, further comprising:
prompting the user operating the navigation apparatus to select one of a hearing compensation mode and a non-hearing compensation mode in which the hearing compensation mode corresponds to the compensating step compensating the audio output by the navigation apparatus, and the non-hearing compensation mode corresponds to no compensation of the audio output by the navigation apparatus.

9. The method of claim 1, further comprising:
receiving, via an input unit, an input signal,
wherein the compensated audio output by the navigation apparatus corresponds to the input signal compensated using the extracted degree of hearing impairment.

10. A navigation apparatus, comprising:
a sensor configured to measure an environmental characteristic including at least one of an altitude of the navigation apparatus and an atmospheric pressure of an atmosphere the navigation apparatus is operating in;
a memory configured to store a hearing characteristic including a degree of hearing impairment for a user operating the navigation apparatus;
an audio unit configured to output audio;
a controller configured to extract the degree of hearing impairment for the user operating the navigation apparatus from the memory based on the measured environmental characteristic, and to compensate the audio output by the navigation apparatus using the extracted degree of hearing impairment for the user operating the navigation apparatus; and
a display unit configured to display road guidance information including a map informing the user about traveling directions,
wherein the audio unit outputs the audio in association with the displayed map.

11. The navigation apparatus of claim 10, wherein the hearing characteristic is pre-stored in the memory and includes a relationship between at least one of a specific altitude and a specific atmospheric pressure with respect to a frequency bandwidth and hearing impairment degree in decibels for the user such that the controller can extract a corresponding frequency bandwidth and hearing impairment degree for a measured altitude or atmospheric pressure.

12. The navigation apparatus of claim 11, wherein the controller is further configured to search the pre-stored hearing characteristic for an altitude or an atmospheric pressure corresponding to the measured altitude or atmospheric pressure, respectively, for the user operating the navigation apparatus, to extract a specific bandwidth of audio to be compensated that corresponds to the searched altitude or atmospheric pressure, and to extract the degree of hearing impairment corresponding to the extracted specific bandwidth.

13. The navigation apparatus of claim 12, wherein when the controller determines there is more than one altitude or atmospheric pressure corresponding to the measured altitude or atmospheric pressure within a preset tolerance range for the user operating the navigation apparatus, the controller is further configured to select an altitude or atmospheric pressure from the pre-stored hearing characteristic that most closely matches the measured altitude or atmospheric pressure.

14. The navigation apparatus of claim 12, wherein the controller is further configured to compensate only a portion of the audio output by the navigation apparatus that corresponds to the extracted specific frequency bandwidth.

15. The navigation apparatus of claim 11, wherein the pre-stored hearing characteristic includes a plurality of users, a plurality of specific altitudes for each user, a plurality of specific atmospheric pressures for each user, and a plurality of frequency bandwidths and hearing impairment degrees in decibels corresponding to the plurality of specific altitudes and atmospheric pressures.

16. The navigation apparatus of claim 10, wherein the controller is further configured to authenticate that the user operating the navigation apparatus is an authorized user to receive the compensated audio output by the navigation apparatus.

17. The navigation apparatus of claim 10, wherein the controller is further configured to prompt the user operating the navigation apparatus to select one of a hearing compensation mode and a non-hearing compensation mode in which the hearing compensation mode corresponds to the compensating step compensating the audio output by the navigation apparatus, and the non-hearing compensation mode corresponds to no compensation of the audio output by the navigation apparatus.

18. The navigation apparatus of claim 10, further comprising:
an input unit configured to receive an input signal,
wherein the compensated audio output by the navigation apparatus corresponds to the input signal compensated using the extracted degree of hearing impairment.

* * * * *